United States Patent
Huang et al.

(10) Patent No.: US 9,593,198 B2
(45) Date of Patent: Mar. 14, 2017

(54) HYBRID ORGANOSILICON THERMOPLASTIC ELASTOMER AND PREPARATION METHOD THEREFOR

(71) Applicant: CHENGDU GUIBAO SCIENCE & TECHNOLOGY CO., LTD., Sichuan (CN)

(72) Inventors: Qiang Huang, Sichuan (CN); Chonghao Wang, Sichuan (CN); Nan Li, Sichuan (CN); Ting Xiong, Sichuan (CN); Buchun Li, Sichuan (CN); Youzhi Wang, Sichuan (CN)

(73) Assignee: CHENGDU GUIBAO SCIENCE & TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 15/108,480

(22) PCT Filed: Dec. 26, 2014

(86) PCT No.: PCT/CN2014/095078
§ 371 (c)(1),
(2) Date: Jun. 27, 2016

(87) PCT Pub. No.: WO2015/096804
PCT Pub. Date: Jul. 2, 2015

(65) Prior Publication Data
US 2016/0319065 A1    Nov. 3, 2016

(30) Foreign Application Priority Data
Dec. 27, 2013    (CN) .......................... 2013 1 0737491

(51) Int. Cl.
| | | |
|---|---|---|
| C08G 77/22 | (2006.01) | |
| C08G 18/40 | (2006.01) | |
| C08G 18/61 | (2006.01) | |
| C08G 18/76 | (2006.01) | |
| C08L 83/14 | (2006.01) | |
| C08G 18/72 | (2006.01) | |
| C08G 18/75 | (2006.01) | |
| C08G 77/452 | (2006.01) | |

(52) U.S. Cl.
CPC ......... C08G 18/4063 (2013.01); C08G 18/61 (2013.01); C08G 18/724 (2013.01); C08G 18/758 (2013.01); C08G 18/7621 (2013.01); C08G 18/7671 (2013.01); C08L 83/14 (2013.01); C08G 77/452 (2013.01)

(58) Field of Classification Search
CPC .............................. C08G 77/452; C08G 18/61
See application file for complete search history.

(56) References Cited

U.S. PATENT DOCUMENTS

| | | | | |
|---|---|---|---|---|
| 6,407,195 B2 * | 6/2002 | Sherman | .............. | C08G 77/458 522/148 |
| 7,563,856 B2 * | 7/2009 | Lange | .................... | A61K 8/898 252/8.61 |
| 2002/0013442 A1* | 1/2002 | Sherman | .............. | C08G 77/458 528/28 |
| 2004/0236055 A1* | 11/2004 | Danner | ................ | C08G 77/388 528/38 |
| 2006/0189778 A1* | 8/2006 | Smith | ................ | C08G 18/6685 528/28 |
| 2007/0270240 A1* | 11/2007 | Smith | ................ | A63B 37/0003 473/368 |

FOREIGN PATENT DOCUMENTS

| | | |
|---|---|---|
| CN | 101815744 | 8/2010 |
| CN | 102300898 | 12/2011 |

(Continued)

OTHER PUBLICATIONS

International Search Report issued in International Application No. PCT/CN2014/095078 dated Apr. 1, 2015 (7 pages) English translation.

Written Opinion issued in International Application No. PCT/CN2014/095078 dated Apr. 1, 2015 (7 pages) English translation (5 pages).

*Primary Examiner* — Margaret Moore
(74) *Attorney, Agent, or Firm* — Hamre, Schumann, Mueller & Larson, P.C.

(57) ABSTRACT

The present invention discloses a hybrid organic silicon thermoplastic elastomer and a preparation method thereof. The copolymer, namely the elastomer, has a structural formula as shown in formula I. In the preparation method, the preparation proceeds in a solution or main body polymerization system through organopolysiloxane with two functionalized ends, a compound with a structural formula of OCN—Y—NCO, a branched compound with a structural formula of

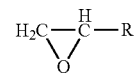

and a compound with a structural formula of $NH_2$—Z—$NH_2$, which can be added or not. The softening temperature of the copolymer is in a range of 40° C.~190° C., and the present invention has high processing mobility.

Formula I

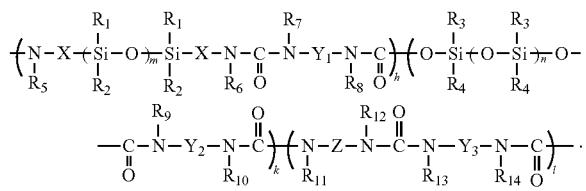

10 Claims, No Drawings

(56) References Cited

FOREIGN PATENT DOCUMENTS

| | | |
|---|---|---|
| CN | 102942667 | 2/2013 |
| CN | 103709412 | 4/2014 |
| JP | S644654 | 1/1989 |
| WO | 2004089616 | 10/2004 |
| WO | 2009059694 | 5/2009 |

* cited by examiner

HYBRID ORGANOSILICON THERMOPLASTIC ELASTOMER AND PREPARATION METHOD THEREFOR

BACKGROUND OF THE INVENTION

Technical Field

The present invention relates to the field of macromolecular materials, in particular to a hybrid organic silicon thermoplastic elastomer and a preparation method thereof.

Description of Related Art

By virtue of their unique chemical structures, organic silicon elastomer materials have excellent properties, and can be widely applied in buildings, automobiles, new energy, roads, bridges, electronics, space flight and aviation, and medical industrials. Traditional organic silicon elastomer materials usually achieve corresponding properties by adding reinforcing inserts such as calcium carbonate and silicon oxide and additives such as cross-linking agents, coupling agents and catalysts in organic silicon polymer base stock during the mixing process. The organic silicon polymer base stock and the cross-linking agent form a stable chemical cross-linking structure at room temperature or at a high temperature, so materials have certain physical properties. However, it is very difficult to damage stable chemical bonds once the bonds are formed, so the organic silicon elastomer materials can be processed once only and do not have elastic heating processing and multiple repeated processing properties like plastic and thermoplastic elastomers.

Blends of organic silicon and other macromolecular materials can be prepared by blending macromolecules, but the organic silicon materials have low surface energy and an obvious separation phenomenon exists after organic silicon materials and other macromolecular materials are blended, so the final products lose use value. Chain segments of the organic silicon polymers can be modified by using the macromolecular synthesis method or chemical modification method, and through importing new molecular chain units, a hybrid organic silicon elastomer material can be prepared. Such novel structure allows co-existence of the organic silicon chain segments and other macromolecular chain segments in the molecular scale, so the material has the features of the organic silicon materials, and is endowed with better properties, for example the enhancement of physical properties, improvement against corrosion resistance, and increase in adhesion.

At present, various organic silicon hybrid materials such as organic silicon-polystyrene copolymer, organic silicon-polyethylene copolymer, organic silicon-poly(urea)urethane copolymer, and organic silicon-polyamide copolymer can be prepared by using the macromolecular synthesis method. Due to the raw materials and difficulties in the process, organic silicon-poly(urea)urethane materials prepared by using the condensation-polymerization method have the biggest industrial production prospect. In particular, the organic silicon-polyurea copolymer has rigid urea bonds, so the organic silicon-polyurea materials have drawn much attention in virtue of its excellent physical properties and thermoplastic processing properties. Patent EP 0250248 discloses a method for synthesizing a linear organic silicon-polyurea segmented copolymer by using a chain extender. Patent US 20040210024 A1 discloses a method for preparing an amino-terminated silicone oil and linear organic silicon-polyurea segmented copolymer.

At present, the linear organic silicon-polyurea segments are mainly linear copolymers. When used as the thermoplastic elastomer material, the rigid polyurea structure forms physical cross-linking points by the effect of hydrogen bonds between molecules. Linear copolymers have high viscosity and poor mobility during processing and are required to be processed at a relatively high softening temperature. In comparison with the linear macromolecular chains, branched macromolecular chain polymers can effectively enhance the processing mobility of the organic silicon polymers and improve the processing performance of the organic silicon polymers. At present, there has been no report on an organic silicon-polyurea hybrid thermoplastic elastomer with high processing mobility seen yet.

BRIEF SUMMARY OF THE INVENTION

To solve the difficulties in the processing of the organic silicon thermoplastic elastomer in the prior art and to develop organic silicon thermoplastic elastomer materials with novel structures, the present invention provides a hybrid organic silicon thermoplastic elastomer and a preparation method thereof.

To solve the above mentioned problems, the present invention adopts the following technical solution.

A hybrid organic silicon thermoplastic elastomer has a structural formula as shown in formula I:

formula I

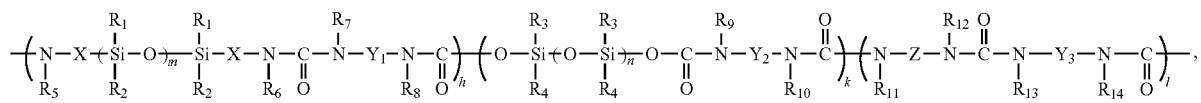

wherein,
m is a positive integer in the scope of 4~100;
n is a positive integer in the scope of 4~100;
h is a positive integer in the scope of 1~40;
k is a positive integer in the scope of 0~40;
l is a positive integer in the scope of 0~40;
$R_1$~$R_4$ are identical or different alkane, olefin and aromatic radicals containing 1~10 carbon atoms;
$R_5$~$R_{14}$ are H or

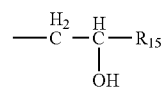

radicals and $R_5$~$R_{14}$ are not all H; $R_{15}$ is at least one of a linear or branched polymer containing 1~100 carbon atoms and a linear or branched organic silicon polymer containing 2~100 silicon atoms, which means that, the

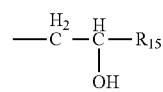

radical is a linear or branched polymer containing 1~100 carbon atoms, or a linear or branched organic silicon polymer containing 2~100 silicon atoms, with an H atom replaced by

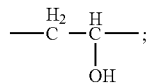

X is alkylene, arylidene, alkylene aryl or arylidene alkyl with 1~10 carbon atoms;

Z is alkylene, arylidene, alkylene aryl or arylidene alkyl with 1~10 carbon atoms;

$Y_1$ is alkylene, arylidene, alkylene aryl or arylidene alkyl with 1~20 carbon atoms;

$Y_2$ is alkylene, arylidene, alkylene aryl or arylidene alkyl with 1~20 carbon atoms:

and $Y_3$ is alkylene, arylidene, alkylene aryl or arylidene alkyl with 1~20 carbon atoms;

To ensure that the prepared hybrid organic silicon thermoplastic elastomer has better properties and wide raw material sources, in the above structural formula, $Y_1$ is any one of 2,6-toluylene, 4,4'-methylene diphenylene, 3,3'-dimethoxy-4,4'-biphenylene, tetramethyl-m-diphenyl, 4,4'-methylene dicyclohexylidene, 3,5,5-trimethyl-3-methylene cyclohexylidene, 1,6-hexylidene, 1,4-cyclohexylidene or 2,2,4-trimethylhexylidene;

$Y_2$ is any one of 2,6-toluylene, 4,4'-methylene diphenylene, 3,3'-dimethoxy-4,4'-biphenylene, tetramethyl-m-diphenyl, 4,4'-methylene dicyclohexylidene, 3,5,5-trimethyl-3-methylene cyclohexylidene, 1,6-hexylidene, 1,4-cyclohexylidene or 2,2,4-trimethylhexylidene; and $Y_3$ is any one of 2,6-toluylene, 4,4'-methylene diphenylene, 3,3'-dimethoxy-4,4'-biphenylene, tetramethyl-m-diphenyl, 4,4'-methylene dicyclohexylidene, 3,5,5-trimethyl-3-methylene cyclohexylidene, 1,6-hexylidene, 1,4-cyclohexylidene or 2,2,4-trimethylhexylidene;

A preparation method of a hybrid organic silicon thermoplastic elastomer is provided, wherein a main body polymer system formed by organopolysiloxane with two functionalized ends, a compound with a structural formula of OCN—Y—NCO, a branched compound with a structural formula of

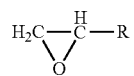

and a compound with a structural formula of $NH_2$—Z—$NH_2$, which can be added or not performs a condensation reaction.

Wherein, the organopolysiloxane with two functionalized ends is organopolysiloxane with two amino-ends or a mixture of the organopolysiloxane with two amino-ends and organopolysiloxane with two hydroxy-ends; specifically, the organopolysiloxane with two functionalized ends is preferably one or a mixture of several of amino-terminated polydimethylsiloxane, amino-terminated polymethylvinylsiloxane, amino-terminated polymethylphenylsiloxane, amino-terminated polymethylphenylvinylsiloxane, hydroxy-terminated polydimethylsiloxane, hydroxy-terminated polymethylvinylsiloxane, hydroxy-terminated polymethylphenylsiloxane, or hydroxy-terminated polymethylphenylvinylsiloxane.

In the compound with a structural formula of OCN—Y—NCO, Y is alkylene, arylidene, alkylene aryl or arylidene alkyl with 1~10 carbon atoms;

in the branched compound with a structural formula of

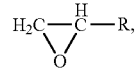

R is at least one of a linear or branched polymer containing 1~100 carbon atoms and a linear or branched organic silicon polymer containing 2~100 silicon atoms; the branched compound with a structural formula of

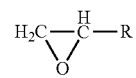

is a linear or branched polymer containing 1~100 carbon atoms, or a linear or branched organic silicon polymer containing 2~100 silicon atoms, with an H atom replaced by

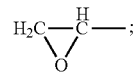

In the compound with a structural formula of $NH_2$—Z—$NH_2$, Z is alkylene, arylidene, alkylene aryl or arylidene alkyl with 1~10 carbon atoms.

A further technical solution is as follows. The main body polymer system is added with an omanic solvent, and the organic solvent can fully dissolve and mix the organopolysiloxane, the compound with a structural formula of OCN—Y—NCO, the branched compound with a structural compound of

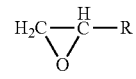

and the compound with a structural formula of $NH_2$—Z—$NH_2$. Specifically, the solvent is at least one of dichloromethane, tetrahydrofuran, methylbenzene, xylol, N,N-dimethylformamide, N,N-dimethylacetamide or isopropanol.

According to the preparation method of the present invention, the organopolysiloxane with two functionalized ends and OCN—Y—NCO compound can react completely first, and then the reaction product is added into the

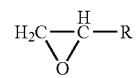

compound ester and $NH_2$—Z—$NH_2$ compound to perform reaction; or, the OCN—Y—NCO compound and $NH_2$—Z—$NH_2$ compound react first, and then the reaction product is added into the organopolysiloxane with two functionalized ends and the

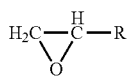

branched compound to perform reaction; or, the organopolysiloxane with two functionalized ends, the OCN—Y—NCO compound, the NH$_2$—Z—NH$_2$ compound and the

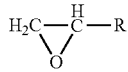

branched compound can be added into the reaction system the same time to react together.

To ensure that the prepared hybrid organic silicon thermoplastic elastomer has better properties, the organopolysiloxane with two functionalized ends has a polymerization degree of 4~100, preferably 4~80.

A further technical solution is as follows. In the organopolysiloxane with two amino terminals or the organopolysiloxane with two amino terminals in the mixture of the organopolysiloxane with two amino terminals and the organopolysiloxane with two hydroxy terminals, the organic silicon polymer is in 0.2-1, preferably 0.4-1, mass ratio to the omanopolysiloxane with two functionalized ends.

A further technical solution is as follows. The compound with the structural formula of OCN—Y—NCO is at least one of toluene diisocyanate, benzhydryl-4, 4'-diisocyanate, hexamethylene diisocyanate, sophorone diisocyanate, xylylene diisocyanate, 4,4'-cyclohexylmethane diisocyanate, phenylene diisocyanate and isomers thereof, and halogen substituted benzhydryl-4,4'-diisocyanate. Preferably, the compound with the structural formula of OCN—Y—NCO is at least one of toluene diisocyanate, benzhydryl-4,4'-diisocyanate, hexamethylene diisocyanate, sophorone diisocyanate, and 4,4'-cyclohexylmethane diisocyanate.

A further technical solution is as follows. The mass ratio of the compound with a structural formula of OCN—Y—NCO to the organopolysiloxane with two functionalized ends is 0.01~0.4, preferably 0.03~0.3.

A further technical solution is as follows. The organic silicon polymer of the branched compound with a structural formula of

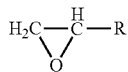

is one of polymethylsiloxane, polyphenylsiloxane, polymethylphenylsiloxane and polymethylvinyisiloxane with a silicon atom number of 2~80.

A further technical solution is as follows. The mass ratio of the branched compound with a structural formula of

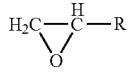

to the organopolysiloxane with two functionalized ends is 0.001~0.15, preferably 0.0015~0.1.

In the present invention, the added

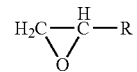

branched compound together with active hydrogen atoms in the polymer can generate a ring-opening reaction to form a new polymer chain.

A further technical solution is as follows. The compound with a structural formula of NH$_2$—Z—NH$_2$ is at least one of ethane diamine, propane diamine, butane diamine, pentamethylene diamine, hexamethylenediamine, p-phenylenediamine, m-phenylenediamine and o-phenylenediamine, preferably at least one of ethane diamine, propane diamine, hexamethylenediamine, p-phenylenediamine and m-phenylenediamine.

A further technical solution is as follows. The mass ratio of the compound with a structural formula of NH$_2$—Z—NH$_2$ to the organopolysiloxane with two functionalized ends is 0~0.15, preferably 0~0.12.

In order to enhance the rate of the condensation and polymerization reaction, in particular the polymerization rate at a low temperature, the reaction system can be added with a proper amount of catalyst, for example, dibutyltin dilaurate.

Compared with the prior art, the present invention has the following beneficial effects:

The hybrid organic silicon thermoplastic elastomer of the present invention is prepared by the ring-opening reaction between the epoxy radicals in the branched compound containing epoxy radicals and the active hydrogen in the organic silicon-polyurea segmented copolymers. The branching degree and softening temperature of the organic silicon-polyurea segmented copolymers can be adjusted through the chain length and dose of the branched compound containing the epoxy radicals; the softening temperature can vary in a range of 40° C.~190° C., and the processing mobility is better. In the present invention, the designed and synthesized organic silicon thermoplastic elastomer can also contain secondary vulcanized double-bond structures, capable of further improving the physical properties of the product and widening the application fields.

The present invention provides a hybrid organic silicon thermoplastic elastomer prepared by a simple condensation reaction method. The preparation method is simple, does not need strict reaction conditions, is easily controlled and amplified, and can realize polymerization at a temperature in a scope of −20° C.~100° C.

The organic silicon segmented copolymer prepared by the present invention is a thermoplastic elastomer with a novel structure, excellent physical properties, 11 Mpa tensile strength and 650% elongation at break. The organic silicon segmented copolymer can give a full play to the property superiorities such as thermal resistance, cold resistance, weather resistance, ozone resistance, air permeability and bio-inertia of the organic silicon polymer materials, can also be molded by injection, extrusion and molding, can be repeatedly processed, and can be applied to various fields such as building bonding glues, LED fixing materials, solar battery encapsulating materials, coating glues, and pressure-sensitive adhesives. The present invention has an efficient preparation method and process, a large selection scope of raw materials, is simply produced in an amplified way, and has a considerable commercial production value.

DETAILED DESCRIPTION OF THE INVENTION

The present invention is explained and described in further detail with reference to embodiments. However, the embodiments of the present invention are not limited to those below.

Property tests in embodiments of the present invention:

1. All molecular weights of all macromolecular polymers are determined by using a gel permeation chromatograph (GPC) at a temperature of 25° C., with reference to the molecular weight of the polystyrene.
2. The tensile strength and the elongation at break are determined with reference to the standard GB/T 528-2009.
3. The softening point is determined by using a vicar softening point method or a dynamic mechanical analysis (DMA) method.
4. The melt index is determined by using a melt index instrument, under the condition of 90° C./2.16 kg.

Embodiment 1

At a temperature of 25° C., in a reactor, 100 g amino-terminated polymethylsiloxane with a polymerization degree of 20 and 10 g hydroxy-terminated polymethylvinylsiloxane with a polymerization degree of 48 are dissolved in a mixed solution of tetrahydrofuran and N,N-dimethylformamide first. After a temperature rise to about 60° C., methylbenzene solution of 12 g benzhydryl-4,4'-diisocyanate is added. The reaction proceeds for 2 h; the temperature continuously rises to 90° C.; 0.2 g ethidene diamine is added, and then the reaction continues for 2 h; and methylbenzene solution of 2 g epoxy resin with a molecular weight of 500 is added. The reaction proceeds for 1 h; then, the reacting substances are moved to an ethanol/aqueous solution to separate the polymers out; the polymers are washed clean and dried in a vacuum at a temperature of 60° C. until the weight is constant. The product yield of the polymer hybrid organic silicon thermoplastic elastomer is 98%, and the product has a weight-average molecular weight of $8 \times 10^4$, a softening point of 120° C., and a melt index of 1.8 g/10 min.

Contrast Example 1

At a temperature of 25° C., in a reactor, 100 g amino-terminated polymethylsiloxane with a polymerization degree of 20 and 10 g hydroxy-terminated polymethylvinylsiloxane with a polymerization degree of 48 are dissolved in a mixed solution of tetrahydrofuran and N,N-dimethylformamide first. After a temperature rise to about 60° C., methylbenzene solution of 12 g benzhydryl-4,4'-diisocyanate is added. The reaction proceeds for 2 h; the temperature continuously rises to 90° C., then, 0.2 g ethidene diamine is added; the reaction continues for 2 h; reacting substances are moved to an ethanol/aqueous solution to separate the polymers out; the polymers are washed clean and dried in a vacuum at a temperature of 60° C. until the weight is constant. The product yield of the polymer hybrid organic silicon thermoplastic elastomer is 96%, and the product has a weight-average molecular weight of $7.5 \times 10^4$, a softening point of 150° C., and a melt index of 1.3 g/10 min.

Embodiment 2

At a temperature of 25° C. 100 g amino-terminated polymethylvinylsiloxane with a polymerization degree of 38, 15 g amino-terminated polymethylphenylsiloxane with a polymerization degree of 10, 15 g amino-terminated polymethylsiloxane with a polymerization degree of 75 and 10 g hydroxy-terminated polymethylphenylsiloxane with a polymerization degree of 58 are dissolved in the mixed solution of dichloromethane and N,N-dimethylformamide first for later use. Prepare the methylbenzene solution of 6 g benzhydryl-4,4'-diisocyanate, 0.2 g toluene diisocyanate and 10 g 4,4'-cyclohexylmethane diisocyanate for later use. Prepare a mixed solution of 0.2 g ethanediamine, 0.3 g propane diamine, 0.1 g p-phenylenediamine and tetrahydrofuran for later use.

A certain amount of mixed solution of dichloromethane and N,N-dimethylformamide are added in a reactor; the above three solutions are dropped at the same time at a temperature of 40° C.; after the dropping is completed, the reaction proceeds for 2 h with a temperature rise to 80° C.; and the methylbenzene solution of 0.5 g epoxy resin with a molecular weight of 200 and 0.7 g of epoxy-terminated polymethylphenylsiloxane with a molecular weight of 800 is added under reflux condensation conditions. The reaction proceeds for 2 h; then, the reacting substances are moved to an ethanol/aqueous solution to separate the polymers out; the polymers are washed clean and dried in a vacuum at a temperature of 60° C. until the weight is constant. The product yield of the polymer hybrid organic silicon thermoplastic elastomer is 97%, and the product has a weight-average molecular weight of $1.1 \times 10^5$, a softening point of 120° C., tensile strength of 6.4 Mpa and an elongation at break of 300%.

Embodiment 3

At a temperature of 25° C., 100 g amino-terminated polymethylphenylsiloxane with a polymerization degree of 30, 15 g amino-terminated polymethylsiloxane with a polymerization of 78, 15 g amino-terminated polymethylphenylsioxan with a polymerization degree of 10, 10 g hydroxy-terminated polymethylphenylsiloxane with a polymerization degree of 15 and 50 g hydroxy-terminated polymethylsiloxane with a polymerization degree of 70 are dissolved in the mixed solution of dichloromethane, methylbenzene and N,N-dimethylformamide first.

After a temperature rise to 60° C., the methylbenzene solution of 2 g isophorone diisocyanate, 0.2 g toluene diisocyanate and 20 g 4,4-cyclohexylmethane diisocyanate, the tetrahydrofuran solution of 1 g propane diamine and 0.2 g o-phenylenediamine, and the methylbenzene solution of 1 g epoxypropane and 0.7 g epoxy-terminated polymethylsiloxane with a molecular weight of 700 are added at the same time. The reaction proceeds for 3 h; then, the reacting substances are moved to an ethanol/aqueous solution to separate the polymers out; the polymers are washed clean and dried in a vacuum at a temperature of 60° C. until the weight is constant. The product yield of the polymer hybrid organic silicon thermoplastic elastomer is 99%, and the product has a weight-average molecular weight of $5 \times 10^4$, a softening point of 80° C., tensile strength of 5.4 Mpa and an elongation at break of 350%.

Embodiment 4

At a temperature of 25° C., 100 g amino-terminated polymethylsiloxane with a polymerization degree of 20, 15 g amino-terminated polymethylorganopolysiloxane with a polymerization degree of 58 and 5 g amino-terminated polymethylvinylsiloxane with a polymerization degree of 30 are dissolved in the mixed solution of tetrahydrofuran and N,N-dimethylformamide first.

While the temperature rises to 60° C., the toluene solution of 20 g 4,4'-cyclohexylmethane diisocyanate is added. Prepare the tetrahydrofuran solution of 1 g propane diamine and the dichloromethane solution of 0.6 g epoxy-terminated polyphenylsiloxane with a molecular weight of 400. The reaction proceeds for 3 h; then, the reacting substances are moved to an ethanol/aqueous solution to separate the polymers out; the polymers are washed clean and dried in a vacuum at a temperature of 60° C. until the weight is constant. The product yield of the polymer hybrid organic silicon thermoplastic elastomer is 99%, and the product has a weight-average molecular weight of $7 \times 10^4$, and a softening point of 100° C.

Contrast Example 2

At a temperature of 25° C., 100 g amino-terminated polymethylsiloxane with a polymerization degree of 20, 15 g amino-terminated polymethylorganopolysiloxane with a polymerization degree of 58 and 5 g amino-terminated polymethylvinylsiloxane with a polymerization degree of 30 are dissolved in the mixed solution of tetrahydrofuran and N,N-dimethylformamide first. While the temperature rises to 60° C., the toluene solution of 20 g 4,4'-cyclohexylmethane diisocyanate is added. Prepare the tetrahydrofuran solution of 1 g propane diamine. The reaction proceeds for 3 h; then, the reacting substances are moved to an ethanol/aqueous solution to separate the polymers out; the polymers are washed clean and dried in a vacuum at a temperature of 60° C. until the weight is constant. The product yield of the polymers is 99%, and the product has a weight-average molecular weight of $5 \times 10^4$ and a high melt temperature, but the melt index cannot be determined at such conditions.

Embodiment 5

At a temperature of 50° C., 100 g amino-terminated polymethylsiloxane with a polymerization degree of 30, 100 g amino-terminated polymethylvinylsiloxane with a polymerization degree of 58 and 5 g hydroxy-terminated polymethylsiloxane with a polymerization degree of 30 are uniformly mixed in a mixer first. After the temperature rises to 90° C., 20 g 4,4'-cyclohexylmethane diisocyanate and 1 g isophorone diisocyanate are added slowly. The reaction proceeds for 2 h, and then 1 g epoxy radical-containing polymethylsiloxane with a molecular weight of 700 is added. The reaction proceeds for 1 h and then the hybrid organic silicon thermoplastic elastomer is obtained. The product yield of the polymer is 100%, and the product has a weight-average molecular weight of $9 \times 10^4$, and a softening point of 150° C.

Embodiment 6

At a temperature of 50° C., 85 g amino-terminated polymethylsiloxane with a polymerization degree of 30, 100 g hydroxy-terminated polymethylvinylsiloxane with a polymerization degree of 55 and 15 g hydroxy-terminated polymethylphenylsiloxane with a polymerization degree of 30 are uniformly mixed in methylbenzene and tetrahydrofuran solutions first. After the temperature rises to 90° C., 20 g hexamethylene diisocyanate, 10 g isophorone diisocyanate and 10 g hexamethylenediamine are added slowly. The reaction proceeds for 2 h, and then 8 g epoxy methylphenylvinylsiloxane with a molecular weight of 700 is added. The reaction proceeds for 1 h and then the hybrid organic silicon thermoplastic elastomer is obtained. The product yield of the polymer is 100%, and the product has a weight-average molecular weight of $1.3 \times 10^5$, and a softening point of 50° C.

Embodiment 7

At a temperature of 50° C., 100 g amino-terminated polymethylsiloxane with a polymerization degree of 40, 80 g amino-terminated polymethylvinylsiloxane with a polymerization degree of 78 and 10 g amino-terminated polymethylphenylsiloxane with a polymerization degree of 30 are uniformly mixed with tetrahydrofuran and methylbenzene solutions first. After the temperature rises to 80° C. the toluene solution of 20 g 4,4'-cyclohexylmethane diisocyanate is added slowly. The reaction proceeds for 2 h, and then 1.8 g γ-glycidoxy propyl trimethoxy silane and 2 g epoxy hexane are added. The reaction proceeds for 1 h and then the hybrid organic silicon thermoplastic elastomer is obtained. The product yield of the polymer is 100%, and the product has a weight-average molecular weight of $8.7 \times 10^4$, and a softening point of 110° C.

Embodiment 8

At a temperature of −10° C., in a reactor, 100 g amino-terminated polymethylvinylsiloxane with a polymerization degree of 40, and 80 g hydroxy-terminated polymethylsiloxane with a polymerization degree of 78 are uniformly mixed in the isopropanol solution. 20 g 4,4'-cyclohexylmethane diisocyanate is added slowly. The reaction proceeds for 1 h, and then 1.8 g γ-glycidoxy propyl trimethoxy silane is added. After the reaction proceeds for 1 h, post-treatment is executed as shown in Embodiment 1 to obtain the hybrid organic silicon thermoplastic elastomer. The product yield of the polymer is 100%, and the product has a softening point of 120° C. 11 Mpa tensile strength and 650% elongation at break.

Embodiment 9

At a temperature of 0° C., in a reactor, 100 g amino-terminated polymethylvinylsiloxane with a polymerization degree of 40, 10 g hydroxy-terminated polymethylsiloxane with a polymerization degree of 30, and 1.0 g epoxy radical-containing polymethylvinylsiloxane with a polymerization degree of 300 are uniformly mixed in the isopropanol solution. The toluene solution of 12 g 4,4'-cyclohexylmethane diisocyanate and 0.1 g dibutyltin dilaurate catalyst are added slowly. After the reaction proceeds for 2 h, post-treatment is executed as shown in Embodiment 1 to obtain the hybrid organic silicon thermoplastic elastomer. The product yield of the polymer is 100%, and the product has a weight-average molecular weight of $5 \times 10^4$, a softening point of 130° C., 8 Mpa tensile strength and 450% elongation at break.

The present invention is described with the explanatory embodiments of the present invention. However, the above embodiments are preferably embodiments of the present invention. The embodiments of the present invention are not limited by those above. It shall be understood that, those skilled in this field can make many other modifications and embodiments which shall fall within the protective scope of the present invention.

What is claimed is:

1. A hybrid organic silicon thermoplastic elastomer, characterized by having a structural formula as shown in formula I:

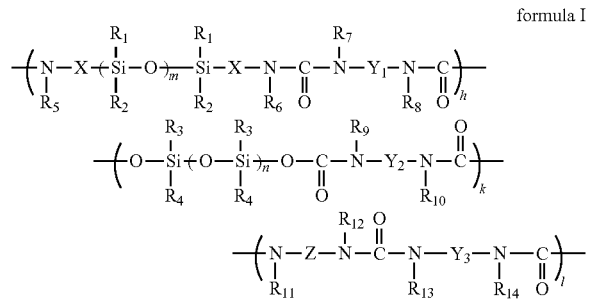

formula I wherein, m is a positive integer in the scope of 4~100;
n is a positive integer in the scope of 4~100;
h is a positive integer in the scope of 1~40;
k is a positive integer in the scope of 0~40;
l is a positive integer in the scope of 0~40;
$R_1$~$R_4$ are identical or different alkane, olefin and aromatic radicals containing 1~10 carbon atoms;
$R_5$·$R_{14}$ are H or

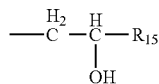

radicals, and $R_5$~$R_{14}$ are not all H;
$R_{15}$ is at least one of a linear or branched polymer containing 1~100 carbon atoms and a linear or branched organic silicon polymer containing 2~100 silicon atoms;
X is alkylene, arylidene, alkylene aryl or arylidene alkyl with 1~10 carbon atoms;
Z is alkylene, arylidene, alkylene aryl or arylidene alkyl with 1~10 carbon atoms;
$Y_1$ is alkylene, arylidene, alkylene aryl or arylidene alkyl with 1~20 carbon atoms;
$Y_2$ is alkylene, arylidene, alkylene aryl or arylidene alkyl with 1~20 carbon atoms;
and $Y_3$ is alkylene, arylidene, alkylene aryl or arylidene alkyl with 1~20 carbon atoms.

2. The hybrid organic silicon thermoplastic elastomer according to claim 1, characterized in that, $Y_1$ is any one of 2,6-toluylene, 4,4'-methylene diphenylene, 3,3'-dimethoxy-4,4'-biphenylene, tetramethyl-m-diphenyl, 4,4'-methylene dicyclohexylidene, 3,5,5-trimethyl-3-methylene cyclohexylidene, 1,6-hexylidene, 1,4-cyclohexylidene and 2,2,4-trimethylhexylidene; $Y_2$ is any one of 2,6-toluylene, 4,4'-methylene diphenylene, 3,3'-dimethoxy-4,4' -biphenylene, tetramethyl-m-diphenyl, 4,4'-methylene dicyclohexylidene, 3,5,5-trimethyl-3-methylene cyclohexylidene, 1,6-hexylidene, 1,4-cyclohexylidene and 2,2,4-trimethylhexylidene;; and $Y_3$ is any one of 2,6-toluylene, 4,4'-methylene diphenylene, 3,3'-dimethoxy-4,4'-biphenylene, tetramethyl-m-diphenyl, 4,4'-methylene dicyclohexylidene, 3,5,5-trimethyl-3-methylene cyclohexylidene, 1,6-hexylidene, 1,4-cyclohexylidene and 2,2,4-trimethylhexylidene.

3. A preparation method of a hybrid organic silicon thermoplastic elastomer, characterized in that, a main body polymer system formed by organopolysiloxane with two functionalized ends, a compound with a structural formula of CN—Y—NCO, a branched compound with a structural formula of

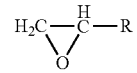

and a compound with a structural formula of $NH_2$—Z—$NH_2$, which be added or not, performs a condensation reaction;

wherein, the organopolysiloxane with two functionalized ends is organopolysiloxane with two amino-ends or a mixture of the organopolysiloxane with two amino-ends and organopolysiloxane with two hydroxy-ends;
in the compound with a structural formula of OCN—Y—NCO, Y is alkylene, arylidene, alkylene aryl or arylidene alkyl with 1~10 carbon atoms;
in a branched compound with a structural formula of

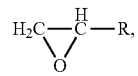

R is at least one of a linear or branched polymer containing 1~100 carbon atoms and a linear or branched organic silicon polymer containing 2~100 silicon atoms;
and in the compound with a structural formula of $NH_2$—Z—$NH_2$, Z is alkylene, arylidene, alkylene aryl or arylidene alkyl with 1~10 carbon atoms.

4. The preparation method of the hybrid organic silicon thermoplastic elastomer according to claim 3, characterized in that, the main body polymer system is added with an organic solvent, and the organic solvent can fully dissolve and mix the organopolysiloxane, the compound with a structural formula of OCN—Y—NCO, the branched compound with a structural compound of

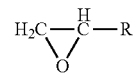

and the compound with a structural formula of $NH_2$—Z—$NH_2$.

5. The preparation method of the hybrid organic silicon thermoplastic elastomer according to claim 3, characterized in that, the organopolysiloxane with two functionalized ends has a polymerization degree of 4~100.

6. The preparation method of the hybrid organic silicon thermoplastic elastomer according to claim 3, characterized in that, the compound with the structural formula of OCN—Y—NCO is at least one of toluene diisocyanate, benzhydryl-4,4'-diisocyanate, hexamethylene diisocyanate, sophorone diisocyanate, xylylene diisocyanate, 4,4'-cyclohexylmethane diisocyanate, phenylene diisocyanate and isomers thereof, and halogen substituted benzhydryl-4,4'-diisocyanate.

7. The preparation method of the hybrid organic silicon thermoplastic elastomer according to claim 3, characterized in that, the organic silicon polymer of the branched compound with a structural formula of

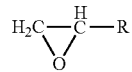

is one of polymethylsiloxane, polyphenylsiloxane, polymethylphenyl siloxane or polymethylvinylsiloxane with a silicon atom number of 2~80.

8. The preparation method of the hybrid organic silicon thermoplastic elastomer according to claim 3, characterized in that, mass ratio of the compound with a structural formula of OCN—Y—NCO to the organopolysiloxane with two functionalized ends is 0.01~0.4; the mass ratio of the branched compound with a structural formula of

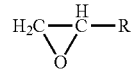

to the organopolysiloxane with two functionalized ends is 0.001~0.15.

9. The preparation method of the hybrid organic silicon thermoplastic elastomer according to claim 3, characterized in that, compound with a structural formula of $NH_2$—Z—$NH_2$ is at least one of ethane diamine, propane diamine, butane diamine, pentamethylene diamine, hexamethylenediamine, p-phenylenediamine, m-phenylenediamine and o-phenylenediamine.

10. The preparation method of the hybrid organic silicon thermoplastic elastomer according to claim 3, characterized in that, mass ratio of the compound with a structural formula of $NH_2$—Z—$NH_2$ to the organopolysiloxane with two functionalized ends is 0~0.15.

* * * * *